J. A. PERKINS.
ROLLER BEARING.
APPLICATION FILED NOV. 14, 1908.

1,002,441.

Patented Sept. 5, 1911.
6 SHEETS—SHEET 2.

WITNESSES

INVENTOR
Julius A. Perkins
BY
ATTORNEY

J. A. PERKINS.
ROLLER BEARING.
APPLICATION FILED NOV. 14, 1908.

1,002,441.

Patented Sept. 5, 1911.
6 SHEETS—SHEET 3.

J. A. PERKINS.
ROLLER BEARING.
APPLICATION FILED NOV. 14, 1908.

1,002,441.

Patented Sept. 5, 1911.

WITNESSES

INVENTOR
Julius A. Perkins
BY
ATTORNEY

FIG. 10.

J. A. PERKINS.
ROLLER BEARING.
APPLICATION FILED NOV. 14, 1908.

1,002,441.

Patented Sept. 5, 1911.

WITNESSES

INVENTOR
Julius A. Perkins
BY
J. Chris Larsen
his ATTORNEY

UNITED STATES PATENT OFFICE.

JULIUS A. PERKINS, OF OMAHA, NEBRASKA.

ROLLER-BEARING.

1,002,441.

Specification of Letters Patent.   Patented Sept. 5, 1911.

Application filed November 14, 1908. Serial No. 462,562.

*To all whom it may concern:*

Be it known that I, JULIUS A. PERKINS, a citizen of the United States of America, and residing at Omaha, in the county of Douglas and State of Nebraska, have invented certain new and useful Improvements in Roller-Bearings, of which the following is a specification, such as will enable those skilled in the art to which it appertains to make and use the same.

This invention relates to bearings, with particular reference to vehicle construction, such as automobiles, wagons, carriages, and the like, and the object thereof is to provide a bearing for such vehicles which is non-frictional in either the rotary, sliding, or twisting movements of the wheels thereof, upon their axles, thereby making the bearings practically indestructible.

A further object is to provide a single non-frictional device for the thrust, in either direction, of the axles in said wheels.

A further object is to provide a non-frictional roller bearing for the load carried thereby.

A further object is to provide non-frictional ball bearings for the axle thrust.

A further object is to provide independently removable raceways for the said rollers and balls, thus avoiding the necessity for exact machining of the axle or hub box; or subjecting same to heat or other treatment for case-hardening or tempering.

My invention is fully described in the following specification, of which the accompanying drawings form a part, in which the same reference characters are used to indicate like parts in each of the views, and in which:—

Figure 1:
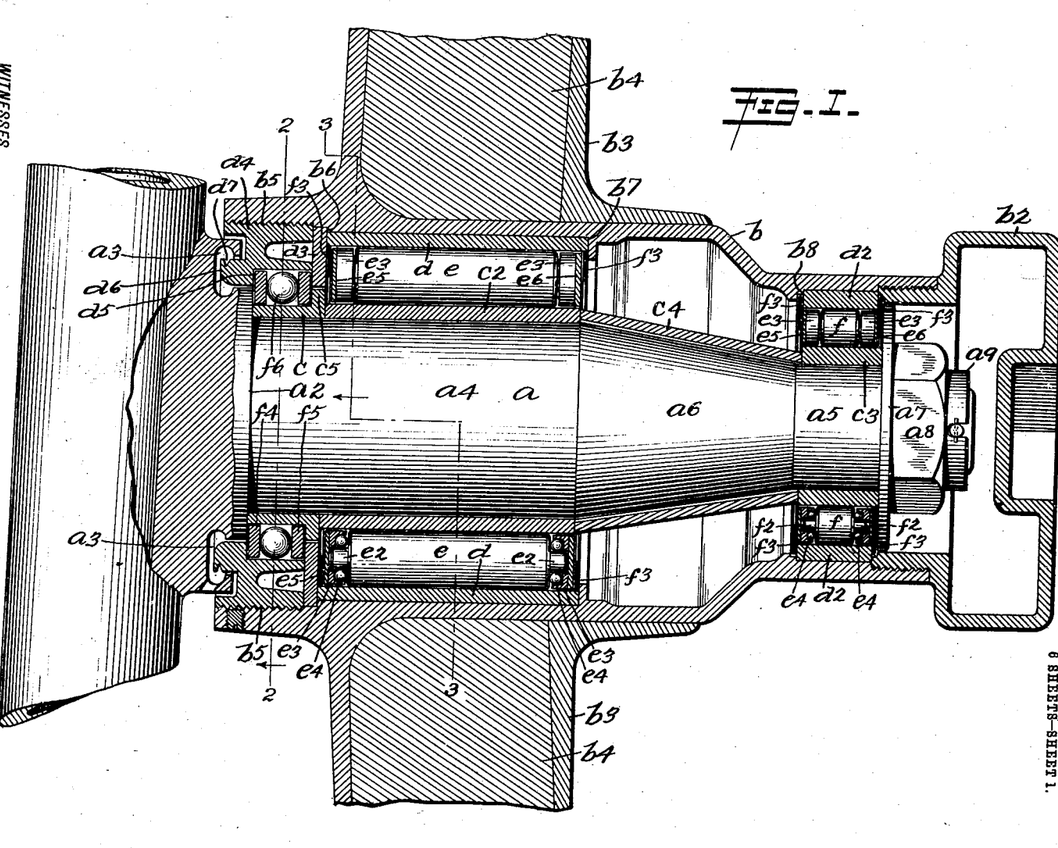
Figure 1 is a central, longitudinal, section, taken through one form of embodiment of my invention.
Figure 2:
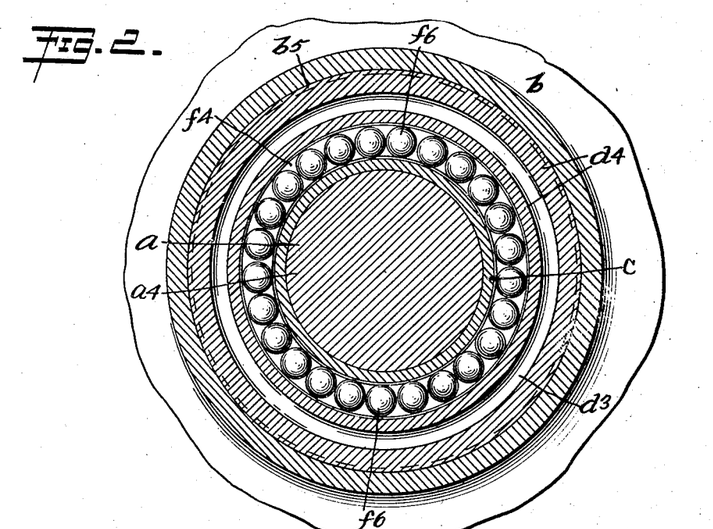
Fig. 2 is a section taken on the line 2—2 of Fig. 1.
Figure 3:
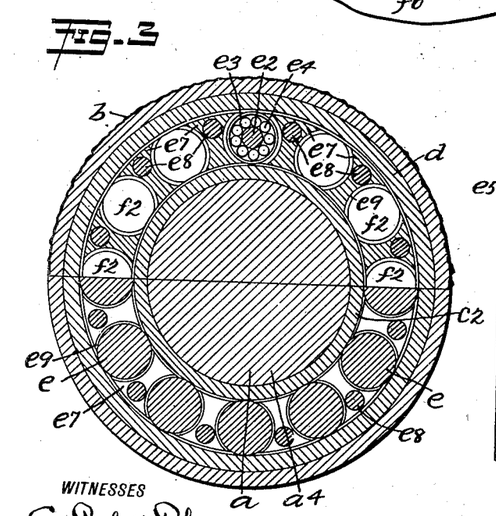
Fig. 3 is a section taken on the line 3—3 of Fig. 1;

In the form of embodiment shown in Fig. 1, the axle is provided with a shank, forming a shoulder $a^2$, and having an annular chamber $a^3$ therein, provided with an outlet at the bottom thereof, said axle comprising two cylindrical portions of different diameters, as shown at $a^4$ and $a^5$, connected by a tapered portion $a^6$, the end of the axle being provided with a washer $a^7$, screw threaded nut $a^8$, and a nut lock $a^9$. The axle $a$ is arranged within a hub box $b$, having a cap $b^2$, screwed thereinto, and having a spoke flange $b^3$ for holding the spokes $b^4$ thereon, the inner end of the box being internally screw threaded at $b^5$ and the inner surface of the said box being provided with shoulders $b^6$, $b^7$, and $b^8$. Mounted on the axle $a$ are a plurality of tube sections $c$, $c^2$, $c^3$, and $c^4$, the last of which is tapered to conform to the tapered portion $a^6$ of the axle, and the former of which carries a flange $c^5$, these elements being preferably made separate, as shown, but I could also make them integral, if desired, and, when in position, these tube sections are forced together and against the shoulder $a^2$ and washer $a^7$ by means of the nut $a^8$, thus locking them to the axle $a$. Within the box $b$, in line with the tube sections $c^2$, and $c^3$, are similar tube sections $d$ and $d^2$, which bear against the shoulders $b^7$ and $b^8$, serving as raceways for rollers $e$ and $f$, while against the shoulder $b^6$ is an annular plate $d^3$ held in this position, in register with the flange $c^5$, by means of a ring $d^4$ engaging the screw thread $b^5$, said ring being provided with a shoulder $d^5$ in line with the shoulder $a^2$, and with a recess forming an annular projection $d^6$ provided with a peripheral groove $d^7$ which is within the chamber $a^3$, thus forming a guard against the admission of dust, water, or other foreign matter, but should any water reach the projection $d^6$, further progress thereof is interrupted by the groove $d^7$, which carries it downwardly to the outlet for the chamber $a^3$.

The rollers $e$ and $f$ are each provided with journals $e^2$ and $f^2$, upon which are rotatably mounted cup shaped blocks $e^3$, carrying balls $e^4$, which support the roller journals and which also take up end-thrust thereof, non-frictionally, and, in practice, I prefer to detachably secure the said blocks upon the roller journals and in such manner as to permit some degree of flexibility thereon. The rollers $e$ and $f$ are carried by cages of suitable size, each of which comprises end plates $e^5$, and $e^6$ having ribs, of a length equal to one-half the longitudinal diameter of the assembled cage, as shown at $e^7$, thereby forming two similar cage members adapted to be held together by means of pins, bolts, or equivalents $e^8$ and forming roller spaces $e^9$ between said ribs.

Figure 4:
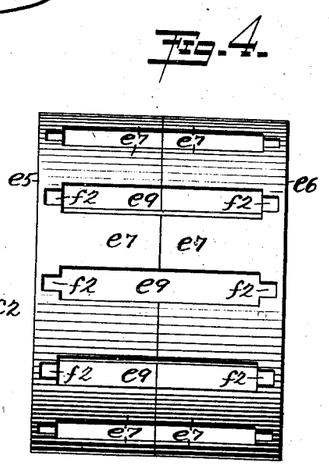
Fig. 4 is a side view of a roller cage which I employ.
Figure 6:
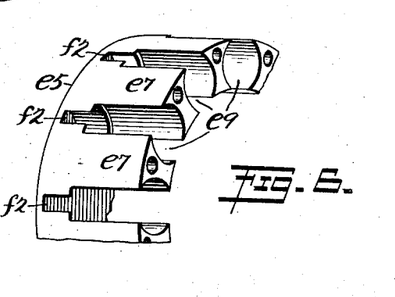
Fig. 6 is a detached, fragmentary, view of a roller cage which I employ.

Adjacent the end plates $e^5$, and $e^6$, as clearly shown in Figs. 4 and 6, I enlarge the width of the ribs $e^7$, thereby forming recesses $f^2$ of less diameter than the roller spaces $e^9$, intended for the reception of the roller end guide blocks $e^3$, thus guiding the rollers in their planetary movement about the axle and, because of the circular formation of the said recesses, the blocks are held against transverse movement, thus maintaining the cage in a position concentric with the axle and the raceways.

As the cages are rotated by the movement of the rollers over their raceways, I provide cage controllers $f^3$, of fiber or other antifriction material, loosely mounted at each end of the said cages, to take the impact of said cages should they, at times, be carried against any contiguous surfaces and thus prevent wear upon either the cages or impact surfaces.

Bearing loosely against the shoulders $a^2$ and $d^5$ is an annular plate $f^4$ and a similar plate $f^5$ bears against the flange $c^5$ and plate $d^3$, a series of balls $f^6$ being arranged between the plates $f^4$ and $f^5$ which serve as a raceway therefor, as will be seen, there being, however, a certain degree of movement possible of the plates and balls in the ball chamber, for reasons hereinafter explained.

By means of this construction, it will be seen that I provide non-frictional bearings for the rotary movement of the hub box about the axle, the rollers $e$ taking the load and the rollers $f$ the twist of the box on the axle, said rollers being also non-frictional in their end-thrust because of the blocks $e^3$ and balls $e^4$ therein.

The roller raceways being rigidly secured, to respectively the axle and to the hub box, movement of the axle, endwise, with relation to the box $b$, moves the raceways carried thereby correspondingly with reference to the raceways in the box, this movement, in either direction, being taken non-frictionally by the balls $f^6$ for the reason that the shoulder $a^2$ forces the plate $f^4$ against the balls $f^6$ which in turn force the plate $f^5$ against the plate $d^3$, in one direction of axle end movement, and the flange $c^5$ forces the plate $f^5$ against the balls, which, in turn, force the plate $f^4$ against the shoulder $d^5$ in the other direction of axle movement, there being, as stated, a predetermined degree of movement possible of the parts within the ball chamber and other contacting parts, and thus the axle thrust is taken up, non-frictionally, in either direction, but the balls $f^6$ and their co-acting elements also serve to prevent wheel twist on the axle because of the difference between the axle radius and the ball race radius, this dual function of the said balls being found important in some forms of construction.

Figure 5:
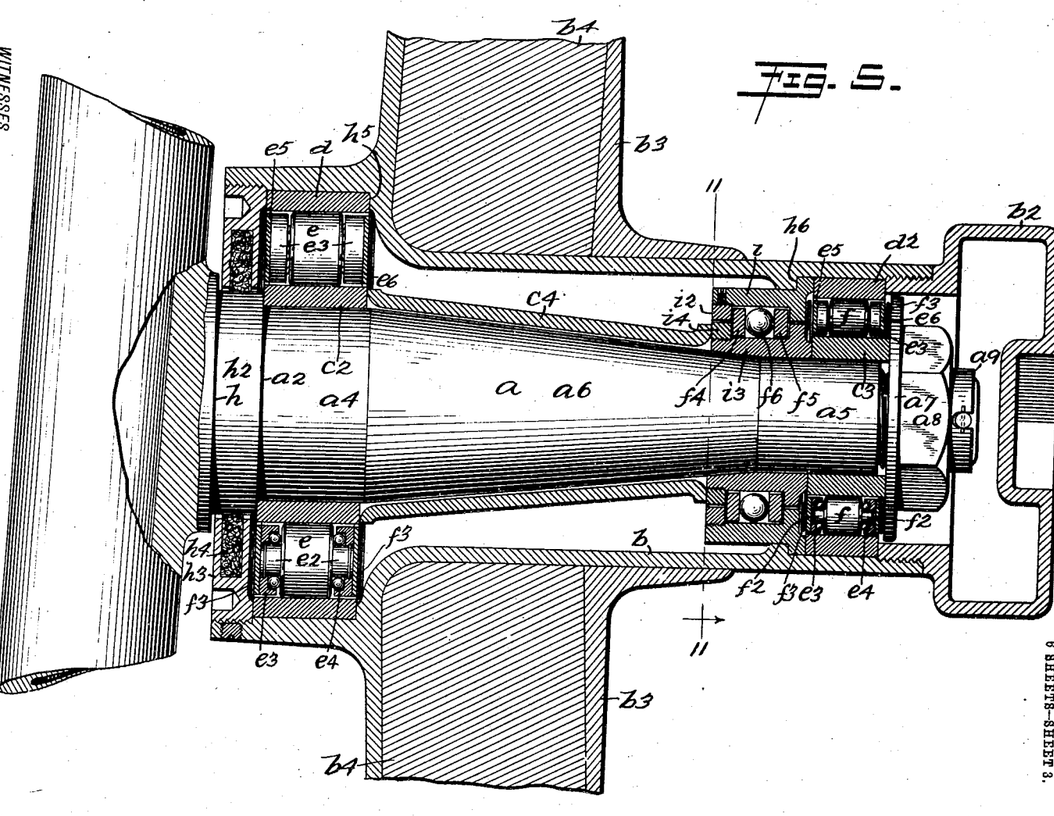
Fig. 5 is a view, similar to Fig. 1, but showing my invention adapted to a standard automobile wheel.

In Fig. 5 I have shown my invention adapted to a certain standard automobile axle and hub box, which differ in conformation slightly over the form just described, the positions of the bearings also being different, the said standard wheels employing ball bearings at two points, which together sustain the weight or load, and in this form of construction I regulate the sizes of my roller bearings and allied parts to the spaces now occupied by the said ball bearings, making my bearings interchangeable therewith. In this form, the axle is provided with two cylindrical portions and a tapered portion, similar to the one described, but somewhat elongated, being also provided with a supplemental shoulder $h$, forming a dust guard seat $h^2$, of greater diameter than the portion $a^4$, about which is a dust guard $h^3$, screwed into the box $b$, and provided with a chamber $h^4$ for the reception of felt or other packing, the box $b$ being provided with shoulders $h^5$ and $h^6$, the former of which fixes the position of the main bearings at a point back of, instead of in, the spoke line, as in the form already described. The rollers $e$ and $f$, in this form, are in all respects similar to those described with the exception that the former are shorter in order to accommodate them to the ball space, but in this form, I place my axle thrust devices adjacent the rollers $f$ instead of to the rear of the rollers $e$ as in the first form.

Bearing against the shoulder $h^6$ is a tube section $i$ which carries a detachable ring $i^2$ at the inner end thereof, directly in line thereof and upon the axle is a similar tube section $i^3$ provided with a ring $i^4$ in line with and similar to the ring $i^2$, said tube sections being also provided with flanges forming shoulders $i^5$ and $i^6$, between which and the rings $i^2$ and $i^4$ are arranged the annular plates $f^4$ and $f^5$ and the series of balls $f^6$. In this form of construction, should the axle move forwardly in the box $b$, the ring $i^4$ forces the plate $f^4$ against the balls $f^6$ which, in turn, force the plate $f^5$ against the shoulder $i^5$ while, if the axle should move backwardly, the shoulder $i^6$ forces the plate $f^5$ against the balls, which, in turn, force the plate $f^4$ against the ring $i^2$, thus taking up the axle-thrust, non-frictionally, in either direction.

As in the former construction described, the cap $b^2$, and dust guard $h^3$ lock the raceways $d$ and $d^2$ in position, while, upon the axle, the nut $a^8$ and shoulder $a^2$ lock the raceways $c^2$, $c^3$ and $i^3$ in position, thus making the axle and connected parts independently movable with relation to the hub box and parts.

Figure 7:
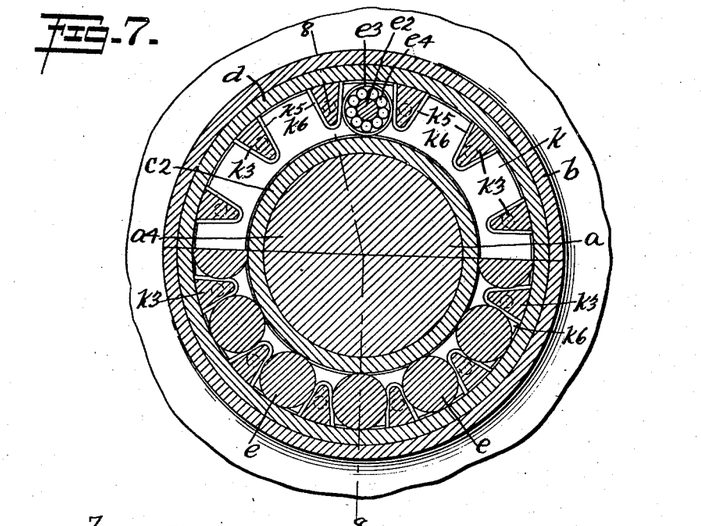
Fig. 7 is a view, similar to Fig. 3, but showing a modification of the cage construction.
Figure 8:
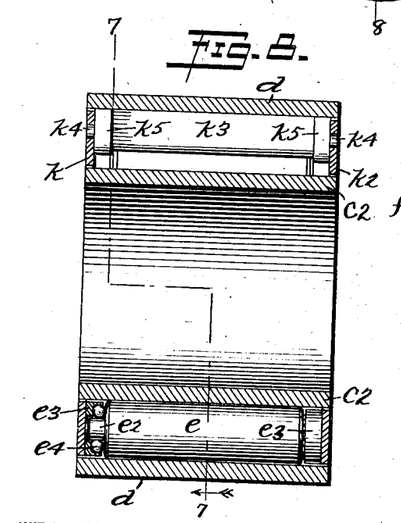
Fig. 8 is a section taken on the line 8—8 of Fig. 7.
Figure 9:
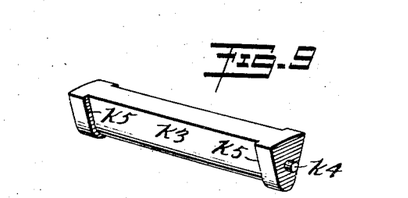
Fig. 9 is a detached, perspective view of a detail of the construction shown in Figs. 7 and 8.

In Figs. 7, 8, and 9, I have shown a modification of the cage construction, whereby the end plates $k$ and $k^2$ are made separate from the ribs $k^3$, the latter having pins or rivets on each end for engagement with corresponding holes in the plates, as shown at $k^4$, the said ribs being provided with enlarged ends forming shoulders $k^5$ and which, when the cage is assembled, form the block recesses $k^6$, this construction being more economical and well adapted to some purposes.

Figure 10:
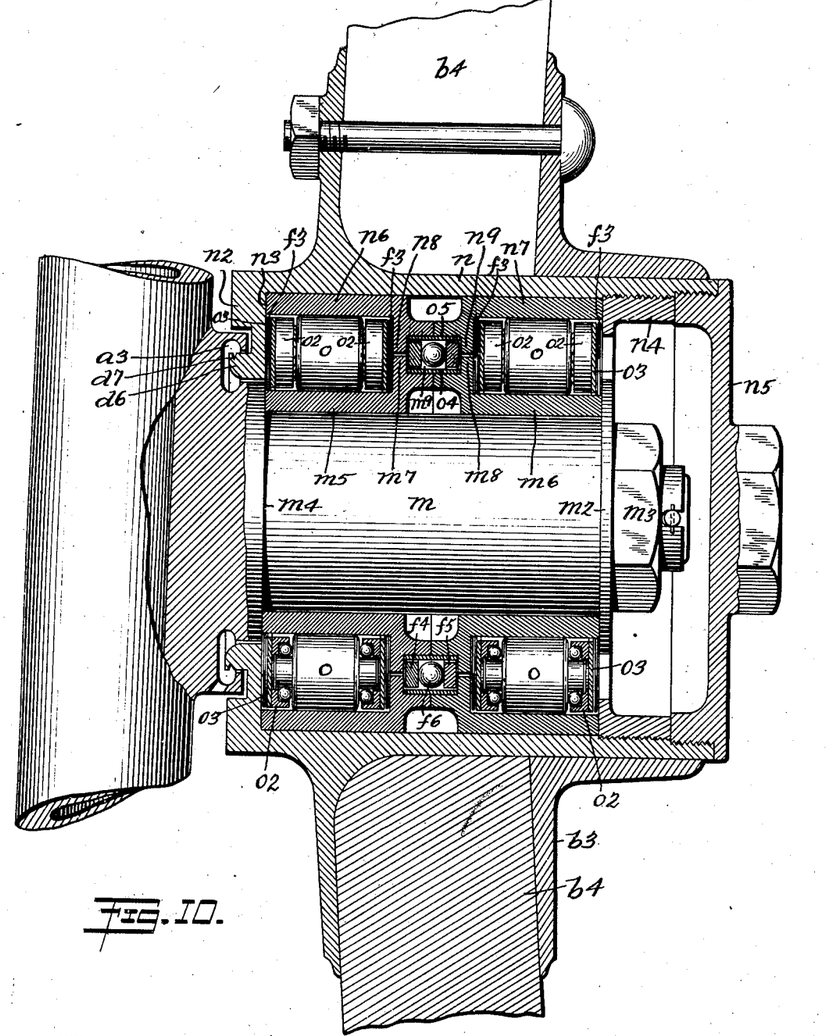
Fig. 10 is a view, similar to Fig. 1, showing my invention applied to a wheel with short spindles.
Figure 11:
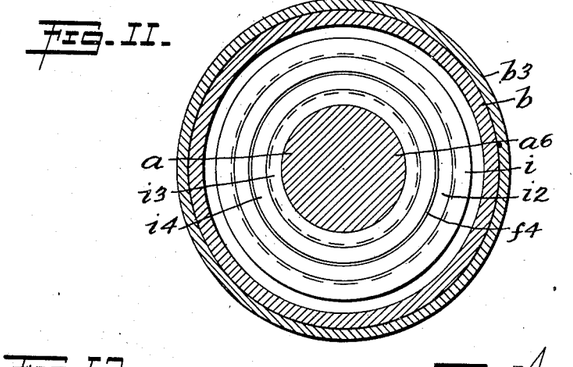
Fig. 11 is a section on the line 11—11 of Fig. 5.

In Fig. 10, I have shown my invention applied to wheels wherein it is desired to keep the box within the line of the rim or tire, thereby making a shorter spindle or axle necessary, this adaptation being preferably for use in connection with heavy trucks and the like. In this form, I employ a straight axle $m$, provided with a washer $m^2$ and nut $m^3$ as well as with a shoulder $m^4$ at the inner end thereof, between which I mount two tubular sections $m^5$ and $m^6$, preferably similar to each other, and each of which has an outwardly directed flange $m^7$ and $m^8$, respectively, said flanges being recessed to, jointly, form one half of a ball chamber $m^9$. The box $n$, in this formation, has an integral dust and water guard $n^2$, forming a shoulder $n^3$, and at the outer end of the box $n$ I provide a ring $n^4$ screw threaded into the said box and locked therein by means of the cap $n^5$, or other equivalent, the screw thread of the latter being of a different pitch than the former in order to accomplish this result, while between the ring $n^4$ and shoulder $n^3$ I mount two tubular sections $n^6$ and $n^7$ of the same sectional formation as the sections $m^5$ and $m^6$, with regard to the flanges $n^8$ and $n^9$ thereon as well as to the recesses therein which, together with the recesses in the sections $m^5$ and $m^6$, collectively form the chamber $m^9$. Between the said tubular sections $m^5$ and $m^6$ and $n^6$ and $n^7$ I place my rollers $o$, all of the same size, and provided with non-frictional end guides as previously described, shown at $o^2$, these rollers being placed upon either side of the chamber $m^9$ and approximately in line with the inner and outer spoke surfaces thus, jointly, taking the load and preventing twisting of the wheel, said rollers being carried by a cage $o^3$ of a form hereinbefore shown or of different form to accomplish the desired result, and I also employ cage controllers $f^3$ for the reasons hereinbefore explained, while within the chamber $m^9$, I prefer to use rings $o^4$ and $o^5$ which cover the joints of the tubular sections and, together with the annular plates $f^4$ and $f^5$, serve as raceways for the balls $f^6$. It will be observed that the spindle, or the journal thereof, is much shorter in this form than in those previously described and is also cylindrical throughout, thereby permitting the use of the interchangeable tubular sections and of interchangeable rollers, this construction also permitting factory assembling and shipment when so assembled. The axle end-thrust is taken up non-frictionally, as described in the preceding forms, by means of the flanges $m^8$ and $n^8$ in one direction and the flanges $m^7$ and $n^9$ in the other direction of axle movement, through the balls $f^6$ and the roller end-thrust is taken up by the non-frictional end guides $o^2$, thus gaining the desired results in a more compact form whereby the box cap need not project beyond the rim or tire and wherein the interchangeable advantage is produced.

Figures 12, 13, 14, 15, 16, 18, 19:
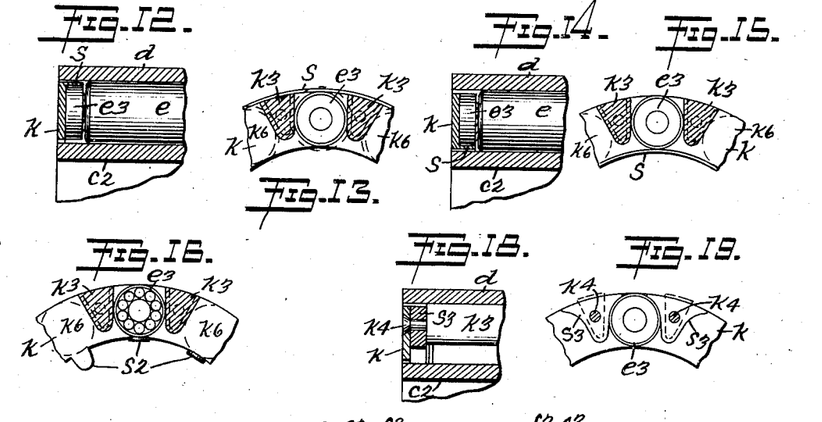
Figs. 12 and 13, 14 and 15, 16 and 17, and 18 and 19, are modifications of the roller cage construction.
Figure 17:
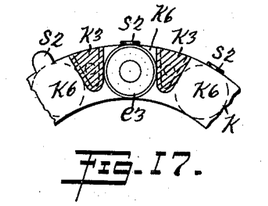
Figure 20:
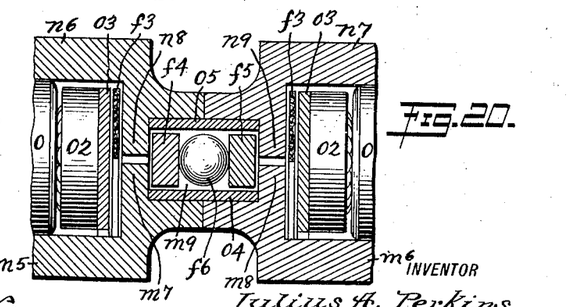
Fig. 20 is an enlarged, fragmentary, view of the form of construction shown in Fig. 10.

In Figs. 12 and 13, I provide the cage end plates with inwardly directed flanges $s$, at the outer edge thereof, serving as stops for the movement of the roller end-guides $e^3$, these flanges being shown upon the inner edge of the said plates in Figs. 14 and 15, and, if desired, lugs $s^2$ may be substituted for the said flanges, either on the outer edge as shown in Fig. 17 or on the inner edge as shown in Fig. 16, in the positions of the end guide recesses $k^6$ to accomplish the same result, and, in Figs. 18 and 19 is shown a modification over that shown in Figs. 7, 8 and 9, in that the sides of the ribs remain the same but the enlarged ends thereof are made separate, being small plates $s^3$ curved upon two sides to form limiting stops for the end guides $e^3$ in their movement radially of the axle $a$, and the said plates are held in position by means of the pins or rivets $k^4$ passing therethrough and into the said end plates.

It will, therefore, be seen that I provide a bearing adapted particularly to vehicle wheels of whatever construction but applicable to any structure or mechanism wherein similar results are desired, i. e., to provide non-frictional means for any of the possible movements of an element rotating upon an axle or of an axle or shaft rotating within a fixed element. It will also be seen that I provide non-frictional axle thrust devices in either direction of axle movement, not confined to any particular point or position, and it will be evident that various structural changes over the forms shown and described will suggest themselves, or be required, to produce this result with but one element, as shown, according to the mechanism in which it is to be used, and, reserving the right to all such changes in and modifications of the said forms of construction,

What I claim as new and desire to secure by Letters Patent is:

1. A bearing, comprising a journal, a box therefor, a tubular section carried by said journal, a tubular section carried by said box, said sections having shoulders thereon collectively forming a chamber, annular plates in said chamber and a series of balls between said plates for taking the strain of the diagonal shoulders against the said plates.

2. A bearing, comprising a journal, a box therefor, tubular sections carried by said journal and said box, and forming sets of raceways, one set of which is provided with shoulders forming a chamber, a series of balls arranged in said chamber to take the strain of said shoulders when moved toward each other in the journal thrust, in either direction, and rollers interposed between the other sets of said raceways.

3. A bearing, comprising a journal, a box therefor, interchangeable tubular sections carried by said journal, interchangeable tubular sections carried by said box, said sections being provided with registering flanges forming roller raceways and a ball chamber, rollers interposed between the corresponding raceways and a series of balls in said chamber to take the strain of diagonal flanges when moved toward each other in the journal thrust, in either direction.

4. A bearing, comprising a journal, a box therefor, interchangeable tubular sections carried by said journal, interchangeable tubular sections carried by said box, said sections having registering flanges thereon forming roller raceways and a ball chamber, rollers interposed between the corresponding raceways, annular rings in said chamber and a series of balls between said rings to take the strain of diagonal flanges when moved toward each other in the journal thrust, in either direction, through said rings.

5. A bearing, comprising a journal provided with two outwardly directed, detachable flanges, a box provided with two inwardly directed, detachable flanges, in register with and contiguous to said first named flanges, said flanges having bearing surfaces at right angles to the axial line of said journal, and an element for taking the journal thrust, in either direction, mounted between said flanges and bearing on said surfaces.

6. A bearing, comprising a journal provided with two outwardly directed flanges, detachably mounted, a box provided with two inwardly directed flanges, detachably mounted, in register with and contiguous to said first named flanges, and forming a chamber, an element in said chamber for taking the journal thrust in either direction, and an annular bearing plate on each side of said element and covering the joint in said chamber.

7. A bearing, comprising a journal, a tubular section thereon, a box, a tubular section therein, said sections having, each two shoulders thereon forming bearing surfaces at right angles to the journal axis, and collectively forming a ball chamber, and a series of balls in said chamber for taking the strain of diagonal shoulders toward each other.

8. A bearing, comprising a journal, a tubular section thereon, a box, a tubular section therein, said sections having, each two shoulders thereon forming bearing surfaces at right angles to the journal axis, and collectively forming a ball chamber, a series of balls in said chamber for taking the strain of diagonal shoulders toward each other, and means for directing said strain in a line parallel to the thrust.

9. A bearing, comprising a journal, a box therefor, interchangeable tubular sections carried by said journal, interchangeable tubular sections carried by said box, said sections having registering flanges forming roller raceways, rollers interposed between the corresponding raceways and means for taking the journal thrust in either direction.

10. A bearing, comprising a journal, a box therefor, interchangeable tubular sections carried by said journal, interchangeable tubular sections carried by said box, said sections having registering flanges thereon forming roller raceways, and a series of rollers interposed between corresponding raceways.

11. A bearing, comprising a journal provided with a shoulder at the inner end and a flange detachably secured at the outer end, a sleeve consisting of a plurality of members abutting on each other held between said shoulder and flange, a box, and anti-friction devices interposed between said sleeve and box.

12. A bearing, comprising a journal, a box provided with a shoulder at the inner end and a cap at the outer end, a tubular member consisting of a plurality of sections abutting on each other held between said shoulder and cap, and anti-friction devices interposed between said journal and tubular member.

13. A bearing, comprising a journal provided with two outwardly directed flanges, a box provided with two inwardly directed flanges, said flanges collectively forming a chamber, a series of balls in said chamber, said flanges meeting at the axes of said balls, and being parallel to a plane therethrough and an inner and an outer bearing ring for said balls within said chamber.

14. A bearing, comprising a journal provided with two outwardly directed flanges, a box provided with two inwardly directed flanges, said flanges collectively forming a chamber, a series of balls in said chamber, an independently rotatable plate on each side of said balls, said flanges meeting at the axes of said balls and said plates covering the joints thereof, and an inner and an outer bearing ring for said balls within said chamber.

15. A bearing, comprising a journal, a box therefor, a tubular section carried by said journal and provided with shoulders, one of which is detachable, a tubular section carried by said box and provided with shoulders, one of which is detachable, said shoulders collectively forming a ball chamber, annular plates in said chamber, and a series of balls between said plates for taking the strain of diagonal shoulders against said plates.

16. A bearing, comprising a journal, a box therefor, tubular sections carried by said journal and said box and forming sets of raceways, one set of which is provided with shoulders forming a chamber, a series of balls arranged in said chamber to take the strain of said shoulders when moved toward each other in the journal thrust, in either direction, rollers interposed between the other sets of said raceways, and a cage for guiding said rollers.

17. A bearing, comprising a journal, a box therefor, tubular sections carried by said journal and said box and forming sets of raceways, one set of which is provided with shoulders forming a chamber, a series of balls arranged in said chamber to take the strain of said shoulders when moved toward each other in the journal thrust, in either direction, rollers interposed between the other set of said raceways, a cage for guiding said rollers, and anti-friction means interposed between said cage and rollers.

18. A bearing, comprising a journal, a box therefor, tubular sections carried by said journal and said box, and forming sets of raceways, one set of which is provided with shoulders forming a chamber, a series of balls arranged in said chamber to take the strain of said shoulders when moved toward each other in the journal thrust, in either direction, rollers interposed between the other sets of raceways, a cage for guiding said rollers, and a cage controller of anti-friction material arranged on each side of said cage.

In testimony that I claim the foregoing as my invention I have signed my name in presence of the subscribing witnesses this 12th day of November 1908.

JULIUS A. PERKINS.

Witnesses:
GEORGE E. MINER,
J. C. LARSEN.